United States Patent Office 3,130,010
Patented Apr. 21, 1964

3,130,010
PROCESS FOR PRODUCTION OF HIGH PURITY CESIUM METAL AND CESIUM COMPOUNDS
Robert J. Moolenaar and Paul R. Juckniess, Midland, Mich., assignors to The Dow Chemical Company, Midland, Mich., a corporation of Delaware
No Drawing. Filed Dec. 4, 1962, Ser. No. 242,855
5 Claims. (Cl. 23—184)

The invention is concerned with the production of high purity cesium hydroxide and of other high purity cesium compounds made therefrom.

Cesium, one of the group I elements or alkali metals, has attained a position of prominence in industry. For many uses, it must have a high degree of purity which has heretofore either been unattainable by known techniques or has been attainable only by techniques that compel the producers or vendors thereof to demand a price in excess thereof which can be paid without economic hardship of the user.

Known ways of making cesium compounds include the preparation of a salt comprising digesting pollucite ore with the appropriate acid to provide the desired salt and subsequently separating the cesium salt of the acid. Such methods, without extensive purification steps, however, produce a salt of a purity which is too low to be acceptable for a number of special uses. A known way of providing high purity cesium bromide from pollucite, a cesium aluminosilicate ore, is described in U.S. Patent 2,481,455. The method therein described, however, is limited to the preparation of cesium bromide. Accordingly, if another cesium compound is desired, the bromide must first be made which entails the expenditure of considerable amount of time per unit of the cesium compound made.

A need for a method of making cesium compounds of high purity which does not entail steps and equipment which adversely affect the economics, long felt, has recently become more-or-less acute. The invention provides a method which meets this need. It is a method which is direct, convenient and efficient and produces high purity cesium compounds.

The invention contemplates and encompasses an improved method of making high purity cesium hydroxide and cesium salts, both organic and inorganic, consisting of (1) reacting pollucite in an inert gas atmosphere with a reductant selected from the class consisting of lithium, potassium, and sodium at a temperature below the vaporization temperature of the reductant employed to distil off substantially all cesium metal in an impure state; (2) redistilling the impure metal so obtained to provide a high purity cesium metal; (3) intermixing the pure cesium metal with mercury to form cesium amalgam; (4) hydrolyzing the amalgam so made to form cesium hydroxide of a purity markedly higher than that obtained by heretofore known methods.

The cesium hydroxide so made then serves as a ready and convenient source of other cesium compounds, e.g., cesium nitrate, chloride, sulfate, phosphate, fluoride, iodide, bromide, carbonate and cesium salts of organic acids having a sufficiently high ionization constant ($K_a$) to form metallic salts, by reacting it with the appropriate acid.

Step 1 of the invention is carried out by admixing cesium-containing ore with an excess of an alkali metal reductant in a vessel provided with or in connection with a distillation unit and provided with a blanket of an inert gas, e.g., argon, helium, neon, krypton, xenon, or radon, and heating the resulting mixture whereby the reductant is caused to react with the ore to provide elemental cesium which is distilled over, leaving the reductant and ingredients of the ore other than cesium behind. The cesium-containing ore is usually fragmented for convenience. However, the size of the ore fragments or particles is not highly important, any size ranging from a very fine powder to relatively large pieces of 2 to 3 square inches in cross section are satisfactory. The pressure employed may be atmospheric or subatmospheric. The temperature employed is dependent both upon the reductant employed and the pressure used. When sodium metal is the reductant, the recommended temperature of the reaction mixture is between about 500° C. and the boiling point of sodium metal at the pressure employed. In practicing the invention, when employing sodium at atmospheric conditions, evidence of reaction can be observed at about 475° C. The temperature is usually thereafter increased to between about 680° C. and 850° C. Correspondingly lower temperatures may be employed at subatmospheric pressures. The time requirement to reduce the cesium ore is inverse to the temperature employed. Analysis of contaminated cesium metal, from different batches, prepared according to step 1, for the principal contaminants, may be typified by the values set out in Table I, below:

| Batch identification | Principal impurities in weight, percent* | | |
|---|---|---|---|
| | Sodium | Potassium | Rubidium |
| 1 | 3.8 | 2.1 | 4.0 |
| 2 | 7.4 | 2.6 | 4.1 |
| 3 | 7.0 | 0.9 | 1.3 |
| 4 | 4.0 | 1.2 | 3.5 |

*The balance was substantially cesium.

The redistillation, i.e., the distillation purification step, identified above as step 2, is carried out in a fractional distillation unit comprising a boiler, distillation column, condenser, and distillate-collecting means. A boiler or redistilling temperature in the range of between about 300° C. and 740° C. may be employed.

The redistillation is carried out under conditions which produce a pressure at the top of the distillation column of between a fraction of a millimeter of mercury and atmospheric pressure. The existing pressure at the top of the column is a result of the effects of: the vapor pressure of cesium, the pressure drop from the bottom to the top of the column, and the through-put rate of the column. A preferred pressure at the top of the column (which is substantially the same as the pressure in the condenser) is between about 5 and about 50 millimeters of mercury.

As illustrative of operating temperatures, employing a distillation unit constructed of stainless steel and comprising a column 3 inches in diameter, 20 feet high, and packed with stainless steel rings, a column top pressure of 5 millimeters of mercury corresponds to a column top temperature of 335° C. and a boiler temperature of 400° C. at the beginning of the distillation, rising to between about 430° and 450° C. at the end.

The amalgamation step, i.e., step 3, is carried out by puddling or otherwise bringing the cesium metal into contact with mercury metal in a suitable chemically inert vessel, e.g., one of glass or polyethylene, under a protective inert gas atmosphere, employing an excess of mercury over the cesium, usually commensurate with the solubility of cesium metal in mercury, viz., about 3.5% at 25° C. and about 4% at 70° C. The amalgamation is exothermic, the temperature usually rising about between 50 and 150 centigrade degrees dependent upon the rate at which the reaction progresses. The reaction is usually complete in between about 1 and 3 minutes. It is recommended that the amalgamation step be maintained at a temperature between about 20° and 70° C.

Step 4 is the hydrolysis step which is carried out by admixing the cesium amalgam produced in step 3 with ionized, distilled, or otherwise substantially pure water. Usually an ample excess of water over that required to react with the cesium present in the amalgam is employed. The amounts of water and amalgam employed are usually ascertained by the solubility of the cesium hydroxide, being produced, in water, since an aqueous solution of the hydroxide is usually desirable. It has been found that the presence of one or more bars or rods, composed of a material that is electrically conducting but chemically unreactive under the conditions, e.g., carbon or graphite, in the reaction mixture, in contact with both the cesium amalgam and water, provides a surface of low hydrogen overvoltage and thereby assists in the dissolution of the cesium amalgam and hence accelerates the rate of reaction.

The cesium hydroxide made according to step 4 may then be employed to prepare salts of such inorganic acids as HCl and HNO$_3$, or of organic acids such as sulfonic; salts thus made may be further employed as reagents and reactants in subsequent uses.

The following example is illustrative of the practice of the invention.

A suitable reactor of the type above described was charged with 29 pounds of sodium metal and 43 pounds of pollucite, a total charge of 72 pounds. The reactor was heated to a temperature of 700° C. over a period of 5 hours. The pressure was gradually reduced during this 5 hour heating period until it was 130 millimeters of mercury absolute. At this point cesium metal began distilling over. The reactor was operated for 2 more hours at an average temperature of 640° C. and an average pressure of 85 millimeters of mercury absolute. The temperature was then reduced to 400° C. and the pressure increased to 250 millimeters over night which was for a period of about 16 hours. The following day it was brought up to a temperature of 630° C. and the pressure reduced to 75 millimeters of mercury for an additional 8 hours and then discontinued. The cesium metal thus produced was analyzed and showed the following results: sodium 4.0%, potassium 1.2%, rubidium 3.5%, and balance substantially cesium to give a cesium efficiency of about 88%.

The cesium so made was then subjected to the purification distillation step (step 2) by charging it to the pot of a still provided with a reflux condenser where it was heated under total reflux conditions for 3½ hours and thereafter the purified cesium product collected.

Analysis of the thus purified cesium metal showed it to contain in percent by weight the values shown in Table II below:

*Table II*

| Sodium | Potassium | Rubidium |
|--------|-----------|----------|
| 0.0011 | 0.0003    | 0.0013   |

Other examples of analysis of cesium metal prepared by the sodium reduction of pollucite, i.e., step 1 above only, contained the impurities in percent by weight, set out in Table III below:

*Table III*

| Sodium | Potassium | Rubidium |
|--------|-----------|----------|
| 3.8    | 2.1       | 4.0      |
| 7.4    | 2.6       | 4.1      |
| 7.0    | 0.9       | 1.3      |

Another sample of cesium metal which had been subjected to steps 1 and 2 viz., the sodium reduction and the purifying distillation steps of the invention, showed it to contain in percent by weight, of metals for which analysis was run, in Table IV below.

*Table IV*

| Impurity: | Percent by weight |
|-----------|-------------------|
| Al        | 0.003             |
| Ba        | 0.0008            |
| B         | 0.0016            |
| Ca        | 0.0023            |
| Cu        | 0.0008            |
| Cr        | 0.0002            |
| Fe        | 0.0018            |
| Mg        | 0.0003            |
| Mn        | 0.0005            |
| Ni        | 0.0003            |
| Pb        | 0.0002            |
| Si        | 0.0013            |
| Sr        | 0.0002            |
| Li        | 0.0016            |
| Ti        | 0.0002            |
| Tl        | 0.0002            |
| Na        | 0.0040            |
| K         | 0.0006            |
| Rb        | 0.0145            |
| Sn        | 0.0008            |

94 grams of the cesium metal, having the analysis set out in Table IV above, were admixed with 3,041 grams of mercury metal to attain amalgamation in accordance with step 3 of the invention.

The amalgam so made was then reacted with water according to hydrolysis, step 4, employing a graphite rod to accelerate the rate of reaction. An amount of cesium hydroxide was thus prepared which corresponded to the stoichiometric quantity producible from the cesium employed. The concentration of cesium hydroxide in the aqueous medium after complete reaction was 37 percent by weight. The cesium hydroxide thus made was then analyzed for the metals for which values are shown in Table V below.

*Table V*

| Impurity: | Percent by weight |
|-----------|-------------------|
| Al        | 0.0001            |
| Ba        | 0.0007            |
| B         | 0.0014            |
| Ca        | 0.0010            |
| Cu        | 0.0001            |
| Cr        | 0.0001            |
| Fe        | 0.0007            |
| Mg        | 0.0010            |
| Mn        | 0.0001            |
| Ni        | 0.0001            |
| Pb        | 0.0001            |
| Si        | 0.0010            |
| Sn        | 0.0007            |
| Sr        | 0.0001            |
| Li        | 0.0034            |
| Ti        | 0.0001            |
| V         | 0.0001            |
| Na        | 0.0007            |
| K         | 0.0004            |
| Rb        | 0.0240            |
| Hg        | 0.0003            |

For comparative purposes, samples of commercially available cesium bromide were procured and analyzed. Table VI below sets forth the results in percent by weight of these analyses as Samples 1 to 4. For ready comparison, cesium metal made according to the method of the invention was also analyzed and is also set forth therein.

Table VI

| Element | CsBr made according to the invention | Analysis of comparative samples of CsBr in percent by weight | | | |
|---|---|---|---|---|---|
| | | 1 | 2 | 3 | 4 |
| Na | 0.0040 | 0.0065 | 0.0141 | 0.0024 | 0.0065 |
| K | .0006 | .0036 | .0154 | .0123 | .0339 |
| Rb | .0145 | .1420 | .0855 | .0468 | .5170 |
| Al | .0003 | .0018 | .0005 | <.0002 | .0005 |
| Ba | <.0008 | <.0008 | <.0008 | .0010 | <.0008 |
| B | <.0016 | <.0016 | <.0016 | <.0016 | <.0016 |
| Ca | .0023 | .0226 | .0013 | .0010 | .0024 |
| Cu | .0008 | .0097 | <.0002 | .0008 | .0008 |
| Cr | <.0002 | .0005 | <.0002 | <.0002 | <.0002 |
| Fe | .0018 | .0081 | .0053 | .0018 | .0015 |
| Mg | .0003 | .0018 | .0002 | .0008 | .0005 |
| Mn | .0005 | .0129 | .0005 | .0005 | .0010 |
| Ni | .0003 | .0010 | .0003 | <.0002 | .0002 |
| Pb | <.0002 | <.0002 | .0018 | <.0002 | <.0002 |
| Si | .0013 | .0029 | .0011 | .0003 | .0064 |
| Sn | <.0008 | <.0008 | N.A. | <.0008 | .0084 |
| Sr | <.0002 | <.0002 | <.0002 | <.0002 | <.0002 |
| Li | <.0016 | <.0016 | <.0016 | <.0016 | <.0016 |
| Ti | <.0002 | .0003 | .0003 | <.0002 | <.0002 |
| Tl | <.0002 | <.0002 | <.0002 | <.0002 | <.0002 |

Reference to Table VI shows that the CsBr made according to the more direct method of the invention is of high purity, the percent of contaminants therein, and particularly the more troublesome Na, K, and Rb, being definitely less.

$Cs_2CO_3$ was made by passing $CO_2$ gas through an aqueous solution of CsOH which had been prepared according to the invention. The $Cs_2CO_3$ so made was analyzed for the predominant contaminants; the results thereof are set out in Table VII below.

Table VII

| Contaminants: | Weight percent based on weight of $Cs_2CO_3$ produced |
|---|---|
| Al | 0.0003 |
| Ba | <0.0007 |
| B | <0.0013 |
| Ca | 0.0004 |
| Cu | 0.0001 |
| Cr | 0.0001 |
| Fe | 0.0005 |
| Mg | <0.0001 |
| Mn | <0.0001 |
| Ni | <0.0001 |
| Pb | <0.0001 |
| Si | 0.0013 |
| Sr | <0.0001 |
| Li | 0.0013 |
| Ti | 0.0001 |
| Tl | 0.0001 |
| Na | 0.0005 |
| K | 0.0005 |
| Rb | 0.0090 |
| Sn | 0.0007 |

It can be readily seen by reference to the analysis of the cesium carbonate made according to the invention, and shown in Table VII, that the practice of the invention produces cesium compounds of markedly high purity.

Having described our invention, what we claim and desire to protect by Letters Patent is:

1. The method of producing a high purity cesium compound consisting essentially of the steps of:

(1) reacting pollucite in an inert gas atmosphere with a reductant selected from the class consisting of lithium, potassium, and sodium at a temperature above the vaporization temperature of cesium metal and below the vaporization temperature of the reductant employed to distil off a cesium product consisting of cesium metal containing certain contaminants;

(2) redistilling the cesium product so obtained to separate cesium from contaminants to produce a substantially pure cesium metal;

(3) intermixing the so obtained substantially pure cesium metal with mercury to form cesium amalgam;

(4) hydrolyzing the amalgam so made to form high purity cesium hydroxide.

2. The method of producing a high purity cesium compound consisting essentially of reacting the CsOH of step (4) of Claim 1 with an acid to form an aqueous solution of the cesium salt of the acid employed and recovering the salt so formed.

3. The method according to claim 1 wherein the reductant employed is sodium, the pressure is atmospheric, and the temperature employed is between about 680° and about 850° C.

4. The method according to claim 1 wherein step 2 thereof is carried out at a boiler temperature of between about 300° and about 740° C., at a distillation column top temperature of between about 335° and about 400° C. at the beginning of the step which rises to between about 430° and about 450° C. during distillation, and at a column top pressure of between about 5 and about 50 millimeters of mercury absolute.

5. The method according to claim 2 wherein said acid is selected from the class consisting of hydrofluoric, hydriodic, hydrobromic, hydrochloric, carbonic, nitric, sulfuric, phosphoric, and salt-forming carboxylic acids.

References Cited in the file of this patent

UNITED STATES PATENTS

| 1,707,637 | Miesse | Apr. 2, 1929 |
| 2,808,313 | Fleischmann | Oct. 1, 1957 |

OTHER REFERENCES

Ind. and Eng. Chem., vol. 16, No. 12, page 1280.